United States Patent [19]

Takagi

[11] Patent Number: 5,510,957
[45] Date of Patent: Apr. 23, 1996

[54] LOCKING AND RETAINING MECHNISM FOR AN ELECTRONIC DEVICE HAVING A DETACHABLE CONTROL UNIT

[75] Inventor: Katsuhiko Takagi, Iwaki, Japan

[73] Assignee: Alpine Electronics, Inc., Tokyo, Japan

[21] Appl. No.: 401,587

[22] Filed: Mar. 9, 1995

[30] Foreign Application Priority Data

Mar. 14, 1994 [JP] Japan .................... 6-068997

[51] Int. Cl.⁶ .................... H04B 1/03
[52] U.S. Cl. .................... 361/814; 361/725; 361/796; 361/801; 174/50; 455/347; 437/297
[58] Field of Search .................... 361/725, 726, 361/752, 759, 796, 801, 802, 814; 248/27.1, 27.3; 455/89, 90, 347; 174/50, 17 R; 439/131, 297, 310

[56] References Cited

U.S. PATENT DOCUMENTS

4,940,414  7/1990  Lee .................... 439/131
5,097,392  3/1992  Tanaka et al. .................... 361/391
5,200,874  4/1993  Ito .................... 361/346

Primary Examiner—Leo P. Picard
Assistant Examiner—Y. Whang
Attorney, Agent, or Firm—Guy W. Shoup; Norman R. Klivans; Patrick T. Bever

[57] ABSTRACT

In an electronic device in which a control unit is detachable from an equipment body, the control unit is engaged and detachably secured to the equipment body by a locking member and a temporary retaining member. A lock release unit causes the locking member to disengage the control unit. When the locking member disengages the control unit, the temporary retaining member retains the control unit and causes the control unit to protrude from the front of the equipment body. Thus, the control unit is temporarily retained by the temporary retaining member in the protruding position and is not allowed to fall off the equipment body onto the ground or floor. In addition, since the operating member is moved to a position where it protrudes from the front of the equipment body, the control unit is easy to remove by hand.

21 Claims, 6 Drawing Sheets

LOCKING AND RETAINING MECHNISM FOR AN ELECTRONIC DEVICE HAVING A DETACHABLE CONTROL UNIT

BACKGROUND OF THE INVENTION

1. Field of the Invention

The present invention relates to electronic equipment, such as on-board automotive audio equipment, in which a control unit is detachably positioned on the main body of the equipment, and more particularly, to a locking and retaining mechanism for an electronic device with a detachable control unit.

2. Description of the Prior Art

Electronic audio equipment typically includes a control unit on which various push buttons and controls are provided. However, in some devices, a control unit for controlling the main body of the equipment is detachable from the equipment body.

Figure 6:
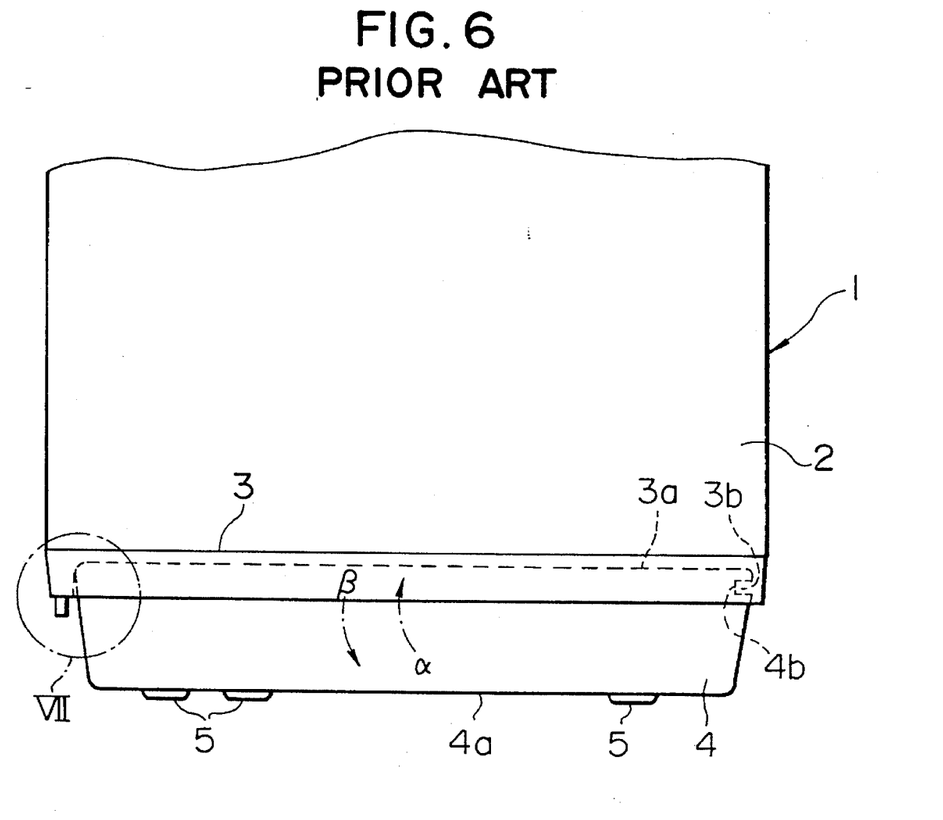
FIG. 6 is a plan view showing a control unit of a prior art on-board automotive audio device.
Figure 7:
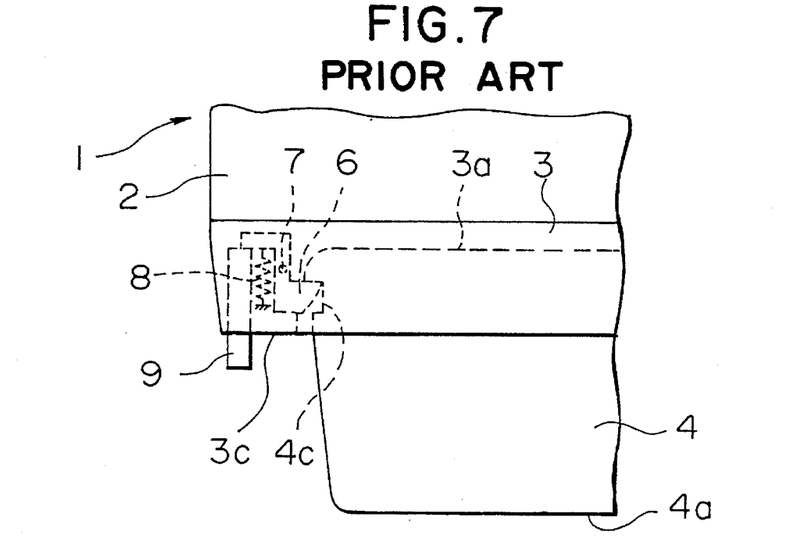
FIG. 7 is an enlarged plan view of a portion VII in FIG. 6.

FIG. 6 is a partial plan view showing a control unit and an equipment body for an on-board automotive audio device and is an example of the type of device discussed above. FIG. 7 is an enlarged plan view of a portion VII in FIG. 6.

In FIG. 6, an equipment body 1 includes a metal chassis 2, which is typically embedded in the dashboard of a vehicle, and a nose portion 3 which is a decorative portion typically made of resin (plastic) and mounted in front of the chassis 2. When the chassis 2 is embedded in the vehicle dashboard, the nose portion 3 is positioned almost corresponding to the front of the dashboard. A recessed portion 3a is formed on the front of the nose portion 3 and a control unit 4 is detachably attached in the recessed portion 3a.

The control unit 4 has an operating surface 4a which includes various control buttons 5 and possibly a liquid crystal display panel or other display. The control unit 4 and the front of the nose portion 3 are electrically connected to each other through an extractable connector (not shown). When the control unit 4 is detached from the equipment body 1 and carried away by the driver, the internal mechanisms and circuitry of the equipment body 1 remaining in the vehicle are inoperable. Thus, this configuration discourages the theft of equipment body 1 from the vehicle.

The attachment structure of the control unit 4 and the nose portion 3 are as follows. At the right end of FIG. 6, a projection 3b formed on the nose portion 3 and a recess 4b formed on the control unit 4 are engaged with each other. At the left end of FIG. 6, the control unit 4 has a lock groove 4c as shown in FIG. 7. A locking hook 6 is supported pivotally about a shaft 7 in the nose portion 3, and is urged counterclockwise by a spring 8. A lock release button 9 is mounted in a left edge portion 3c of the nose portion 3.

In order to attach the control unit 4, the recess 4b (see FIG. 6) is first engaged with the projection 3b, and the control unit 4 is pivoted about the engaging portion in a direction α so as to be fitted in the recessed portion 3a of the nose portion 3. At this time, the lock groove 4c formed on the control unit 4 and the locking hook 6 are engaged and the control unit 4 is securely attached to the nose portion 3.

In order to detach the control unit 4 from the equipment body 1, the lock release button 9, formed in the edge portion 3c of the nose portion 3 (see FIG. 7), is depressed. By this action, the locking hook 6 is pivoted clockwise and disengaged from the lock groove 4c. An urging member (not shown) for urging the control unit 4 to detach from equipment body 1 is mounted in the recessed portion 3a of the nose portion 3, and, when the engagement of the locking hook 6 and the lock groove 4c is released, the control unit 4 protrudes while pivoting in a direction β in FIG. 6 under the urging force of the urging member. Then, the projection 3b and the recess 4b are disengaged by the driver/owner while the control unit 4 is held in the driver's hand.

Unfortunately, in the above discussed prior art device, the control unit 4 and the nose portion 3 are completely disengaged on the left side of FIG. 6 when the lock release button 9 (shown in FIG. 7) is depressed. Therefore, unless the control unit 4 is held in the driver's hand, it comes off the nose portion 3 and falls to the floor or ground. Accordingly, the driver must press the lock release button 9 with one hand while holding the control unit 4 in the other hand; this makes handling inconvenient.

Further, in the structure shown in FIGS. 6 and 7, the lock release button 9 is located in the left edge portion 3c (see FIG. 7) of the nose portion 3, to the left of the control unit 4. Therefore, when an attempt is being made to press the lock release button 9, the control unit 4 partially blocks the driver's finger. Furthermore, since the surface area of the edge portion 3c of the nose portion 3 (see FIG. 7) is limited, the lock release button 9 located therein must be relatively small. This is also inefficient.

SUMMARY

The present invention is directed to a locking and retaining mechanism for an electronic device with a detachable control unit in which the control unit is retained on the equipment body after partial release and advanced to a position where it is easy to access and hold. The control unit is temporarily retained in this position without being completely separated from the equipment body. Thus, this facilitates the detachment and handling of the control unit with a single hand.

Space is provided efficiency by locating a temporary retaining member for the control unit and a locking member in the same portion of the equipment body. Ease of disengaging the equipment body and the control unit are provided by mounting a lock release unit in the control unit itself.

According to one embodiment of the invention, there is provided a locking and retaining mechanism for detachably positioning the control unit to the equipment body. The locking and retaining mechanism includes: a retaining portion formed on the equipment body; a matching retaining portion formed on one end of the control unit for attaching one end of the control unit to the equipment body; a locking member located in the equipment body to engage and detachably secure (i.e., lock) another end of the control unit to the equipment body; a temporary retaining member located in the equipment body to engage and retain the control unit together with the locking member and to temporarily retain the control unit after the locking member has been released; and a lock release unit for disengaging the locking member and the control unit.

In one embodiment of the invention, the locking member and the temporary retaining member are positioned very close to each other in the equipment body and are engaged by a common retaining portion (i.e., a lip, groove, or edge) formed in the control unit. In this embodiment, engaging hooks of the locking member and engaging hooks of the temporary retaining member are arranged in close contact. In one embodiment, the temporary retaining member is fitted in a recessed portion or cutout of the locking member so that the retaining portions (lips, grooves, or edges)

formed in the control unit to engage the temporary retaining member and locking member and by which the locking member and the temporary retaining member hold the control unit, can be a single continuous retaining portion (i.e., a continuous lip, grove or edge). However, the retaining portion with which the locking member is engaged and the retaining portion with which the temporary retaining member is engaged do not necessarily have to be continuous and can be separate members formed close to each other.

In one embodiment, the locking member is rotatably supported by a support shaft disposed in the equipment body and the locking member is urged by a spring or other urging member in a direction to engage and retain the control unit. The temporary retaining member is also rotatably supported about the support shaft and is linearly slidable relative to the support shaft in a direction to protrude from the front of equipment body. The temporary retaining member is also urged by an urging member in a direction to engage and retain the control unit.

In one embodiment of the invention, the lock release unit is mounted in the control unit. The lock release unit causes the locking member to disengage the control unit. One end of the lock release unit projects from the operating surface of the control unit and the other end of the lock release unit extends into the equipment body through the control unit. When the lock release unit is depressed, the locking member is directly or indirectly pushed by the base of the lock release unit and moved in the lock release direction (i.e., that direction which causes the locking member to disengage the control unit).

According to the invention, one end of the control unit is retained by the retaining portion. When the control unit is pushed and pivoted about the retaining portion, toward the equipment body, the locking member and the temporary retaining member disposed in the equipment body both engage and retain the control unit. Thus, the control unit is securely attached to the equipment body. When the engagement of the locking member and the control unit is released by the lock release unit, the temporary retaining member retains the control unit and protrudes from the equipment body. Thus, the control unit is temporarily retained by the temporary retaining member in position protruding from the front of the equipment body. Then, the control unit can be detached from the equipment body (i.e., the temporary retaining member) by pulling the control unit by hand to release the temporary engagement of the temporary retaining member and the control unit. Therefore, the control unit never falls off the equipment body when the locking member is disengaged. Furthermore, since the control unit is moved to a position protruding from the front of the equipment body, it is easily removed by hand.

If the locking member and the temporary retaining member are located close to each other and retained by the same retaining portions formed in the control unit as discussed above, it is possible to install the locking and retaining mechanism of the invention in a minimum amount of space and achieve an efficient arrangement of the mechanisms in the equipment body. Furthermore, the structure of the control unit is simplified.

By supporting the locking member and the temporary retaining member by a common support shaft disposed in the equipment body, the support structure is also simplified.

With the lock release unit mounted on the control unit, the lock release operation can be performed more easily than the case in which the lock release unit is mounted on the side of the control unit in the equipment body as in the prior art device of FIG. 7. Additionally, since, according to the invention, the lock release unit is mounted on the control unit, the lock release unit can be larger and easier to engage with a finger.

DESCRIPTION OF THE PREFERRED EMBODIMENTS

Embodiments of the invention will now be described with reference to the drawings.

Figure 1:
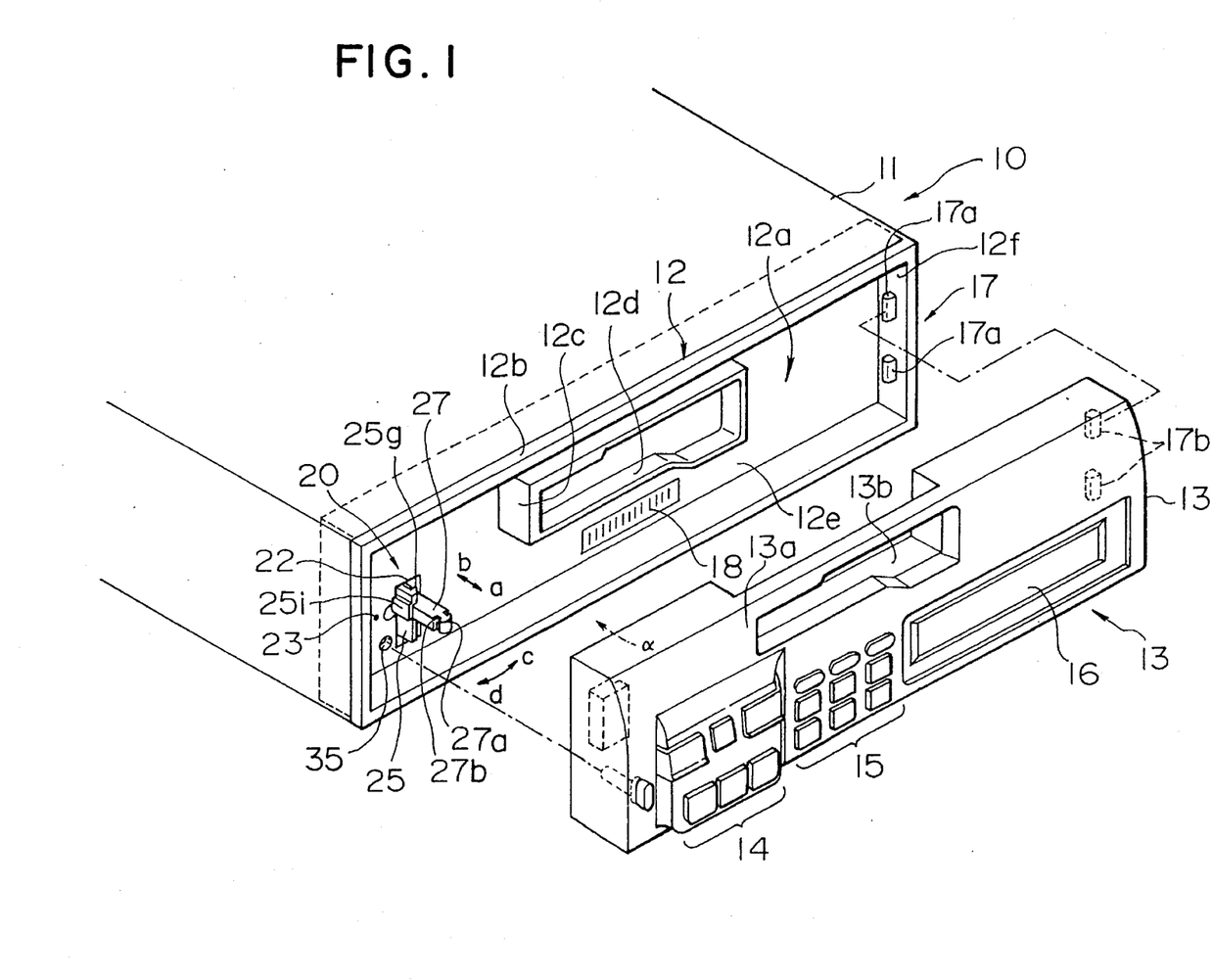
FIG. 1 is a partial perspective view of a locking and retaining mechanism for an on-board automotive audio device according to one embodiment of the invention.
Figure 2:
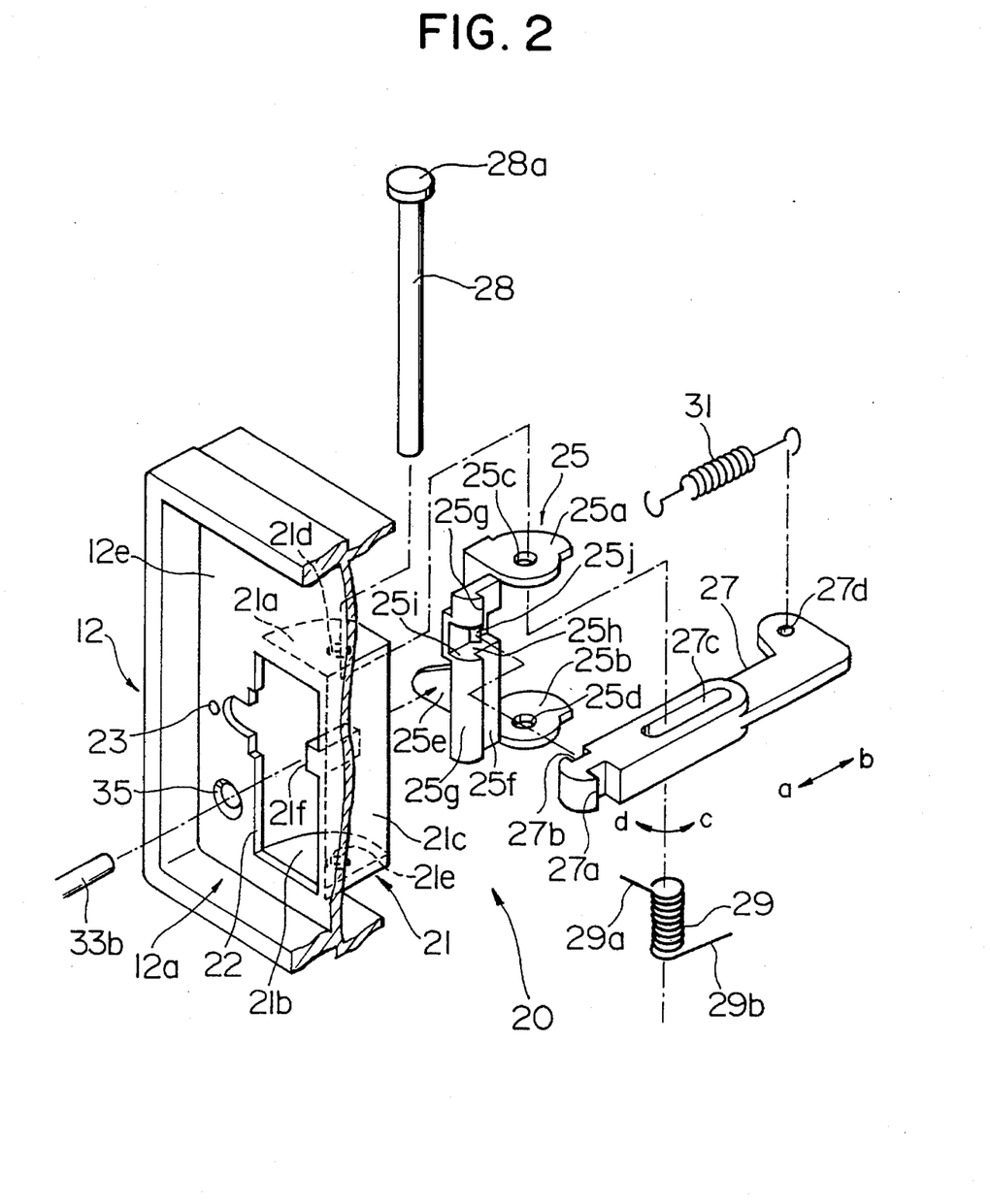
FIG. 2 is a partially exploded perspective view of a locking member and a temporary retaining member according to the invention.
Figure 3:
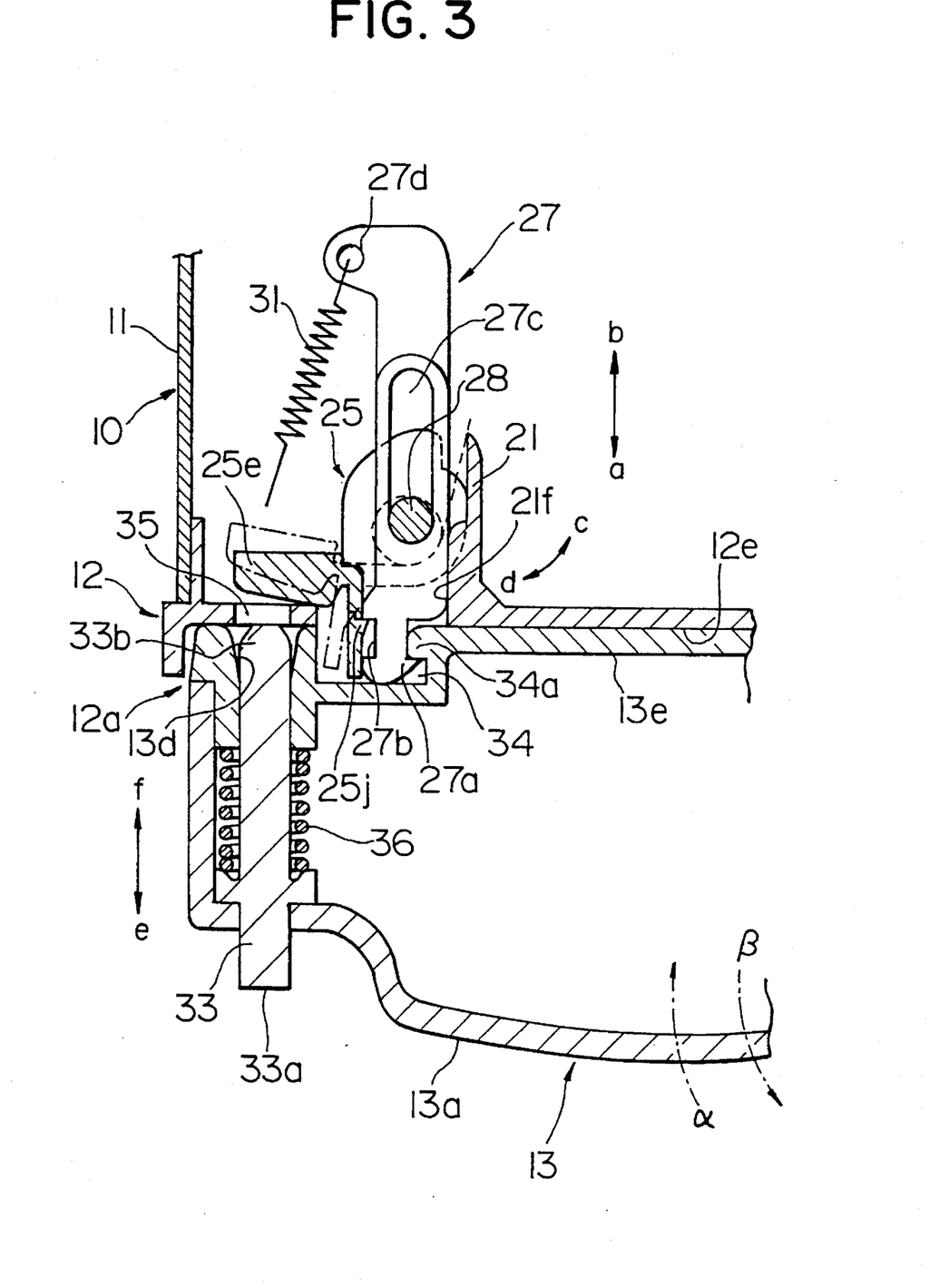
FIG. 3 is a partial sectional view of the locking member and the temporary retaining member.
Figure 4:
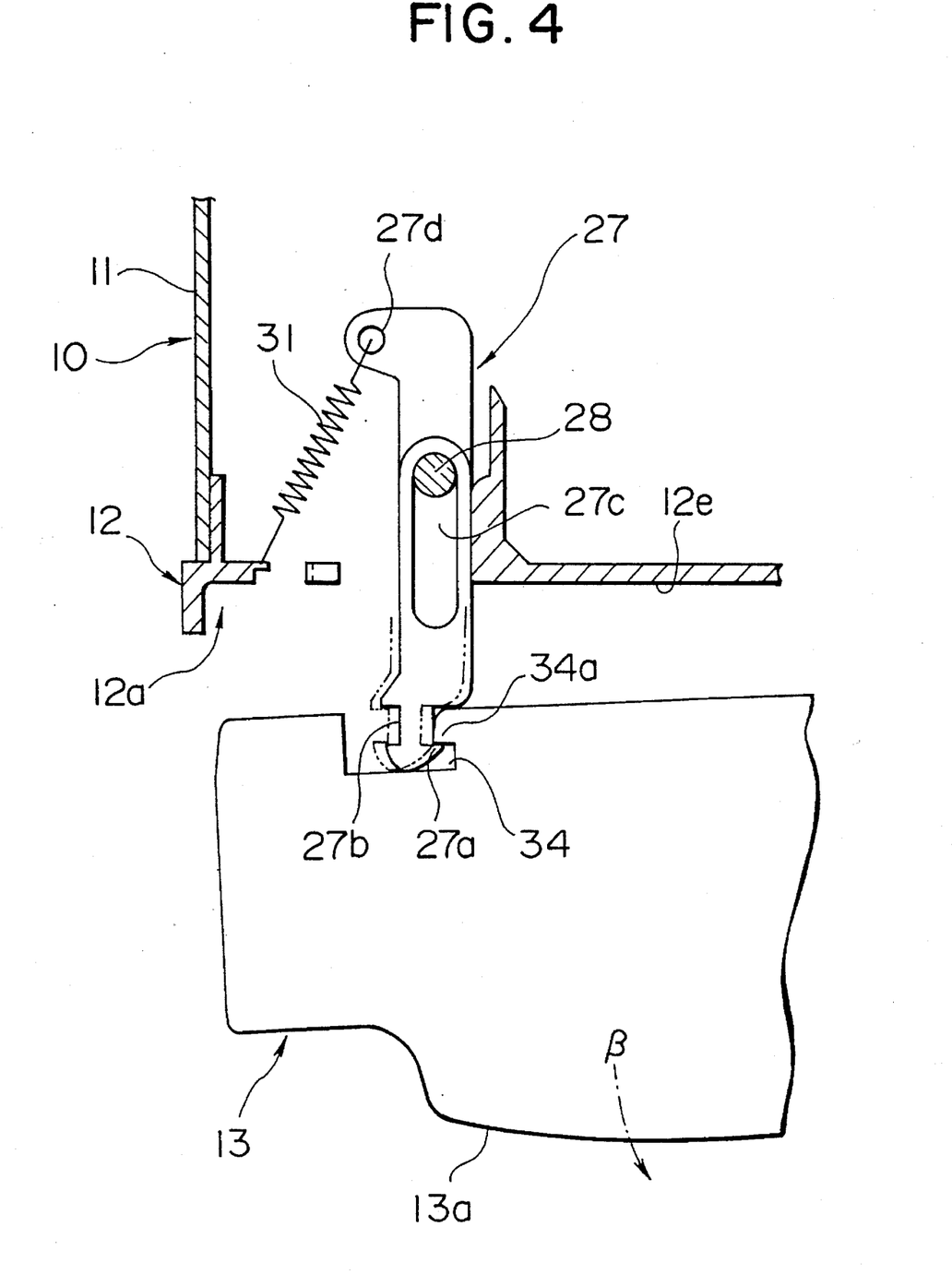
FIG. 4 is a partial sectional view of the temporary retaining member in a state where the temporary retaining member protrudes from the nose portion.

FIG. 1 is a perspective view of a locking and retaining mechanism for an on-board automotive audio device according to the invention. FIG. 2 is an exploded perspective view of the structure and mounting of a locking member and a temporary retaining member according to the invention. FIGS. 3 and 4 are sectional views respectively of the mount structure of the locking member and the temporary retaining member showing the operation thereof.

Referring to FIG. 1, an equipment body 10 of an on-board automotive audio device includes a chassis 11, typically made of metal, and a nose portion 12, typically made of resin (plastic) and mounted in front of the chassis 11. The nose portion 12 has a recessed portion 12a at the front thereof. Herein, the front of the equipment body 10 means the inside of the recessed portion 12a and the surface 12b of the peripheral frame of the nose portion 12.

In the recessed portion 12a of the nose portion 12, a rectangular insertion frame 12c is integrally formed to protrude forward from a recessed bottom surface 12e. Frame 12c includes an insertion path 12d for a cassette tape.

A control unit 13 is attached to the nose portion 12. The control unit 13 is dimensioned so as to fit in the recessed portion 12a of the nose portion 12 and is provided with an operating surface 13a on which various control buttons 14 and 15 are arranged. The operating surface 13a also has a display device 16, such as a liquid crystal panel, mounted thereon. An insertion opening 13b is formed through the control unit 13. The inner surface of the insertion opening 13b and the inner surface of the insertion path 12d are aligned with each other when the control unit 13 is fitted in the recessed portion 12a of the nose portion 12. The cassette tape is loaded from the insertion opening 13b into a cassette tape driving mechanism (not shown) in the equipment body 10 through the insertion path 12d of the nose portion 12. Those of skill in the art will recognize that insertion opening 13b and insertion path 12d could also be dimensioned to accept compact disks and mini-disks and that the invention is equally applicable to electronic devices for use with these media.

A pin connector 18 is mounted a little below the center of the recessed bottom surface 12e of the nose portion 12 and a terminal plate, on which connecting terminals are provided, is mounted on the rear side of the control unit 13 (not shown). When the control unit 13 is fitted in the recessed portion 12a of the nose portion 12, the connecting terminals of the terminal plate and contact pins of the pin connector 18 are brought into electrical contact, thereby electrically connecting switching devices and the like operated by the control buttons 14 and 15 in the control unit 13 and the internal circuits of the equipment body 10.

A right inner surface 12f of the peripheral frame of the nose portion 12 and a right side surface (right edge portion) 13c of the control unit 13 have a retaining portion 17. The retaining portion 17 includes a pair of retaining projections 17a projecting from the inner surface 12f of the nose portion 12, and a pair of retaining recesses 17b formed on the right side surface (right edge portion) 13c of the control unit 13. When the retaining projections 17a are engaged with the retaining recesses 17b, the right portion of the control unit 13 in FIG. 1 is retained by the nose portion 12.

A locking and temporary retaining mechanism 20 is mounted on the left side of the recess inner surface 12f of the nose portion 12 in FIG. 1. Locking and temporary retaining mechanism 20 is a separate mechanism from the above-mentioned retaining portion 17 and is located opposite to the retaining portion 17 across the insertion frame 12c.

As shown in FIG. 2, in the locking and temporary retaining mechanism 20, a support frame 21 is integrally formed in the inner surface of the recessed bottom surface 12e of the nose portion 12. This support frame 21 has an upper support plate 21a, a lower support plate 21b, and a side support plate 21c. The recessed bottom surface 12e of the nose portion 12 has an opening 22, whose outer shape corresponds to that of the support frame 21, and a spring hole 23 is formed on the left side of the opening 22 in FIG. 2. A slide stopper surface 21f is formed a little above the center of the inner surface of the side support plate 21c. The upper support plate 21a and the lower support plate 21b have support holes 21d and 21e, respectively, formed in line with each other.

In the support frame 21, a locking member 25, typically made of resin material, is mounted. Bearing plates 25a and 25b are integrally formed with a predetermined space at the top and bottom of the rear side of the locking member 25. Bearing plates 25a and 25b have bearing holes 25c and 25d, respectively. The bearing plates 25a and 25b are inserted between the support plates 21a and 21b of the support frame 21 and the bearing holes 25c and 25d are positioned coaxially with the support holes 21d and 21e. A lock release contact portion 25e extends on the left side of the locking member 25.

A front end 25f of the locking member 25 projects forward from the opening 22 of the nose portion 12 and has a locking hook 25g at the leading edge thereof as shown in FIG. 1. The front end 25f also has a recessed portion 25h (see FIG. 2) on the side thereof and the locking hook 25g has a cutout portion 25i corresponding to the recessed portion 25h. A shallow stopper projection 25j has a triangular cross section (shown best in FIG. 3) formed at the bottom of the recessed portion 25h (see FIG. 2).

A temporary retaining member 27 is provided which is typically made of resin material. The temporary retaining member 27 has a retaining hook 27a at the leading end thereof and is alternatively called a temporary retaining member or a temporary retaining arm. The temporary retaining member 27 is fitted snugly in the recessed portion 25h of the locking member 25, and, in this state, the retaining hook 27a is positioned in the cutout portion 25i of the locking hook 25g of the locking member 25. When the retaining hook 27a is in the cutout portion 25i, the retaining hook 27a and the locking hook 25g are fitted together. A stopper groove 27b is formed at the leading end of the left side of the temporary retaining member 27. When the retaining hook 27a and the locking hook 25g are fitted together, the stopper projection 25j formed in the locking member 25 and the stopper groove 27b are engaged (see FIG. 3). The stopper projection 25j and the stopper groove 27b function as a locking mechanism (locking means) or a temporary catching mechanism (temporary catching means) for catching or lightly locking the temporary retaining member 27 in the locking member 25 when the retaining hook 27a and the locking hook 25g are fitted together.

The temporary retaining member 27 has a linear slot 27c. A support shaft 28 is inserted in the support hole 21d of the upper support plate 21a, through the bearing hole 25c of the locking member 25, and passed through the slot 27c of the temporary retaining member 27 (see FIG. 1). Furthermore, the support shaft 28 is passed through a torsion spring 29, the lower bearing hole 25d of the locking member 25, and the support hole 21e of the lower support plate 21b. Then, a head 28a of the support shaft 28 abuts against the upper surface of the upper support plate 21a, and a ring member (not shown) for example, a fall preventing ring, is mounted at the bottom of the support shaft 28 on the lower surface of the lower support plate 21b (not shown).

As a result of the configuration discussed above, the locking member 25 is rotatably supported on the support shaft 28 and locking member 25 can rotate in the directions (c) and (d). The temporary retaining member 27 can also rotate on the support shaft 28 in the directions (c) and (d). In addition, due to linear slot 27C, temporary retaining member 27 can move linearly respective to the support shaft 28, in directions (a) and (b), a distance equal to the length of the linear slot 27c.

The above-mentioned torsion spring 29 acts as an urging member or a spring member for turnably urging the locking member 25 and the temporary retaining member 27 in the direction (c). One arm 29a of torsion spring 29 is retained by the locking member 25 and the other arm 29b is retained by the inner surface of the side support plate 21c (see FIGS. 1 and 3) so that the locking member 25 is urged relative to the support shaft 28 in the direction (c). Since the temporary retaining member 27 is fitted in the recessed portion 25h of the locking member 25, it is also urged respective to the support shaft 28 in the direction (c) by the urging force of the torsion spring 29.

A spring hole 27d is formed at the rear end of the temporary retaining member 27 (see FIGS. 1 and 3), and a tension spring 31 is hung as an urging member or a projecting elastic presser between the spring hole 27d and the spring hole 23 formed in the nose portion 12 (see FIG. 1). The temporary retaining member 27 is urged by the tension spring 31 in the direction (a), that is, in the direction to protrude ahead of or in front of the nose portion 12. Since the tension spring 31 is hung at the rear end of the temporary retaining member 27, offset from the main axis of temporary retaining member 27, the temporary retaining member 27 is also pivotally urged in the direction (c) by the tension spring 31.

As shown in FIG. 3, an engagement member 34 is formed on a rear plate 13e of the control unit 13 (see FIGS. 3 and 4), and a projection 34a is also formed as a retaining portion at the rear end of the engagement member 34. With the projection 34a, both the locking hook 25g of the locking member 25 and the retaining hook 27a of the temporary retaining member 27 are commonly retained.

As shown in FIGS. 1 to 3, a lock release unit 33 (see FIG. 3) having a push button structure is mounted on the left side of the control unit 13 and urged in a protruding direction (e) by a spring (spring member) 36 disposed inside the control unit 13 whereby a push button portion 33a at the leading end of the lock release unit 33 protrudes forward from the operating surface 13a of the control unit 13 (see FIG. 1).

A rear end 33b of the lock release unit 33 is slidably supported in a slide hole 13d formed through the rear plate 13e of the control unit 13. When the push button portion 33a, projecting from the operating surface 13a is depressed, the rear end 33b of the lock release unit 33 extends rearward from the rear plate 13e of the control unit 13.

An eject operating hole 35 is formed on the side of the opening 22 on the recessed bottom surface 12e of the nose portion 12. The lock release contact portion 25e formed in the locking member 25 is positioned inside the eject operating hole 35 (see FIG. 3). As shown in FIG. 3, when the control unit 13 is fitted in the recessed portion 12a of the nose portion 12, the rear end 33b of the lock release unit 33 faces the eject operating hole 35.

The operation of the locking and retaining mechanism will now be described.

When the control unit 13 is removed from the nose portion 12 as shown in FIG. 1, the temporary retaining member 27 is slid relative to the support shaft 28 (see FIG. 2) in the direction (a) by the urging force of the tension spring 31 and the retaining hook 27a at the leading end of the temporary retaining member 27 is separated from the locking hook 25g of the locking member 25 (see FIG. 2). As a result, the temporary retaining member 27 is projected forward of the nose portion 12 (ahead of the equipment body 10). The locking member 25 is turnably urged in the direction (c) (see FIG. 2) by the urging force of the torsion spring 29. Furthermore, the temporary retaining member 27 is similarly urged in the direction (c) by the urging force of the locking member 25 and by the tensile force of the tension spring 31. Since the temporary retaining member 27 receives the turnable urging force in the direction (c) from the locking member 25 and the tension spring 31, as shown in FIG. 4, the side surface of temporary retaining member 27 abuts against the slide stopper surface 21f formed on the side support plate 21c of the nose portion 12 (see FIG. 3).

In order to attach the control unit 13 to the nose portion 12, the retaining recesses 17b formed on the right side (right edge portion) 13c of the control unit 13 are first engaged with the retaining projections 17a of the nose portion 12 and the control unit 13 is pivoted about the retaining portion 17 in a direction (a) and pressed into the recessed portion 12a (see FIG. 1). At this time, the retaining hook 27a at the leading end of the temporary retaining member 27 is retained by the projection 34a on the rear plate 13e of the control unit 13 (see FIG. 4). When the control unit 13 is further pressed in, the temporary retaining member 27 is pushed by the rear plate 13e of the control unit 13, and the temporary retaining member 27 retreats in the direction (b) (see FIG. 1). Then, as shown in FIG. 3, the stopper groove 27b of the temporary retaining member 27 is engaged with the stopper projection 25j formed in the locking member 25, and the temporary retaining member 27 is locked in the locking member 25 while the retaining hook 27a and the locking hook 25g are interlocked.

At this time, the locking hook 25g of the locking member 25 is retained by the projection 34a of the control unit 13 (see FIGS. 2 and 3). In other words, the control unit 13 is caught in the nose portion 12 on the right side 13c by the engagement of the retaining portion 17 and the projection 34a is engaged by both the locking hook 25g of the locking member 25 and the retaining hook 27a of the temporary retaining member 27 of the locking and temporary retaining mechanism 20 on the left side in FIG. 1. When both the locking hook 25g and the retaining hook 27a are commonly engaged by the projection 34a formed on the rear plate 13e of the control unit 13, the control unit 13 is firmly locked in and attached to the recessed portion 12a of the nose portion 12.

In order to disengage the control unit 13 from locking member 25, the push button portion 33a of the lock release unit 33 is depressed (see FIG. 3). Since the push button portion 33a projects from the operating surface 13a of the control unit 13 (see FIG. 1), lock release unit 33 is easily accessed and depressed with a finger. Furthermore, since the operating surface 13a has a large area, the push button portion 33a can be made relatively large, thereby also facilitating the pressing operation. This is in contrast to the typical prior art systems discussed above.

When the push button portion 33a is depressed, the rear end 33b of the lock release unit 33 passes through the eject operating hole 35 formed on the recessed bottom surface 12e of the nose portion 12, and presses the lock release contact portion 25e of the locking member 25 located inside the eject operating hole 35 (see FIG. 3). The locking member 25, which is urged in the direction (c) by the torsion spring 29 (see FIG. 2), is pressed by the rear end 33b of the lock release unit 33, and turned in the direction (d) (see FIG. 3). At this time, the stopper projection 25j of the locking member 25 is disengaged from the stopper groove 27b of the temporary retaining member 27 as shown by the broken line of FIG. 3. Thus, the engagement between the locking member 25 and the temporary retaining member 27 is released and the temporary retaining member 27 slides forward relative to the support shaft 28 under the tensile force of the tension spring 31 and protruded almost linearly in the direction (a) (see FIG. 3).

Since the temporary retaining member 27 is urged both in the directions (a) and (c) by the tension spring 31, the retaining hook 27a and the projection 34a of the control unit 13 are still engaged with each other when the temporary retaining member 27 projects in the direction (a) (see FIG. 4).

The temporary retaining member 27 is urged in the protruding direction (a) and the direction (c) by the tension spring 31 (see FIG. 3). Therefore, when the temporary retaining member 27 protrudes in the direction (a), the retaining hook 27a is still engaged with the projection 34a of the control unit 13.

Although the control unit 13 pivots in a direction β (see FIGS. 3 and 4) about the retaining portion 17, where the retaining projections 17a and the retaining recesses 17b are engaged with each other, it stops after pivoting a predetermined angle as shown in FIG. 4. In other words, the control unit 13 is held (temporarily retained) in a position, where the temporary retaining member 27 projects from the nose portion 12, while the retaining hook 27a of the temporary retaining member 27 and the projection 34a of the control unit 13 are engaged.

The left part of the control unit 13 stops in this position, projecting from the recessed portion 12a of the nose portion 12 ahead of the equipment body 10, and protrudes from equipment body 10 by the same distance as the temporary retaining member 27. Therefore, the control unit 13 can be easily accessed by hand. When the control unit 13 is pulled by hand, the retaining hook 27a of the temporary retaining member 27 is slightly pivoted in the direction (d) as shown by the broken line of FIG. 4, and disengaged from the projection 34a. When the control unit 13 is further pulled, the retaining portion 17 is disengaged.

When the control unit 13 is removed, as shown in FIG. 1, the temporary retaining member 27 protrudes from the recessed bottom surface 12e of the nose portion 12 due to the urging force of the tension spring 31. Although the temporary retaining member 27 may be left as it is, if it is pushed by the finger it retreats in the direction (b). In this state, the stopper projection 25j of the locking member 25 and the stopper groove 27b are engaged as shown in FIG. 3 and the temporary retaining member 27 is locked in a position shifted in the backward direction (b).

If the control unit 13 is attached when the temporary retaining member 27 is retreated in the direction (b) and locked, the projection 34a on the rear side of the control unit 13 is retained by the locking hook 25g of the locking member 25 and the retaining hook 27a of the temporary retaining member 27, and the attachment state shown in FIG. 3 is obtained.

As described above, with an on-board automotive audio device designed according to the invention, since the control unit 13, attached to the nose portion 12, is retained by both the locking hook 25g of the locking member 25 and the retaining hook 27a of the temporary retaining member 27, the control unit 13 is securely held by the nose portion 12. When the locking hook 25g of the locking member 25 is released, the temporary retaining member 27 is projected by the tension spring 31 in the direction (a), and, as shown in FIG. 4, the control unit 13 is temporarily retained in a position where the temporary retaining member 27 protrudes from the nose portion 12. Therefore, the control unit 13 is easily accessed by hand. In addition, since only the relatively small retaining hook 27a of the temporary retaining member 27 holds the control unit 13 in the temporary retaining state shown in FIG. 4, the retaining hook 27a and the projection 34a of the control unit 13 are disengaged by a relatively small force when the control unit 13 is pulled by hand. Therefore, the control unit 13 can be detached with only a small force by being pulled by hand when the control unit is in the temporary retaining state shown in FIG. 4.

Figure 5:
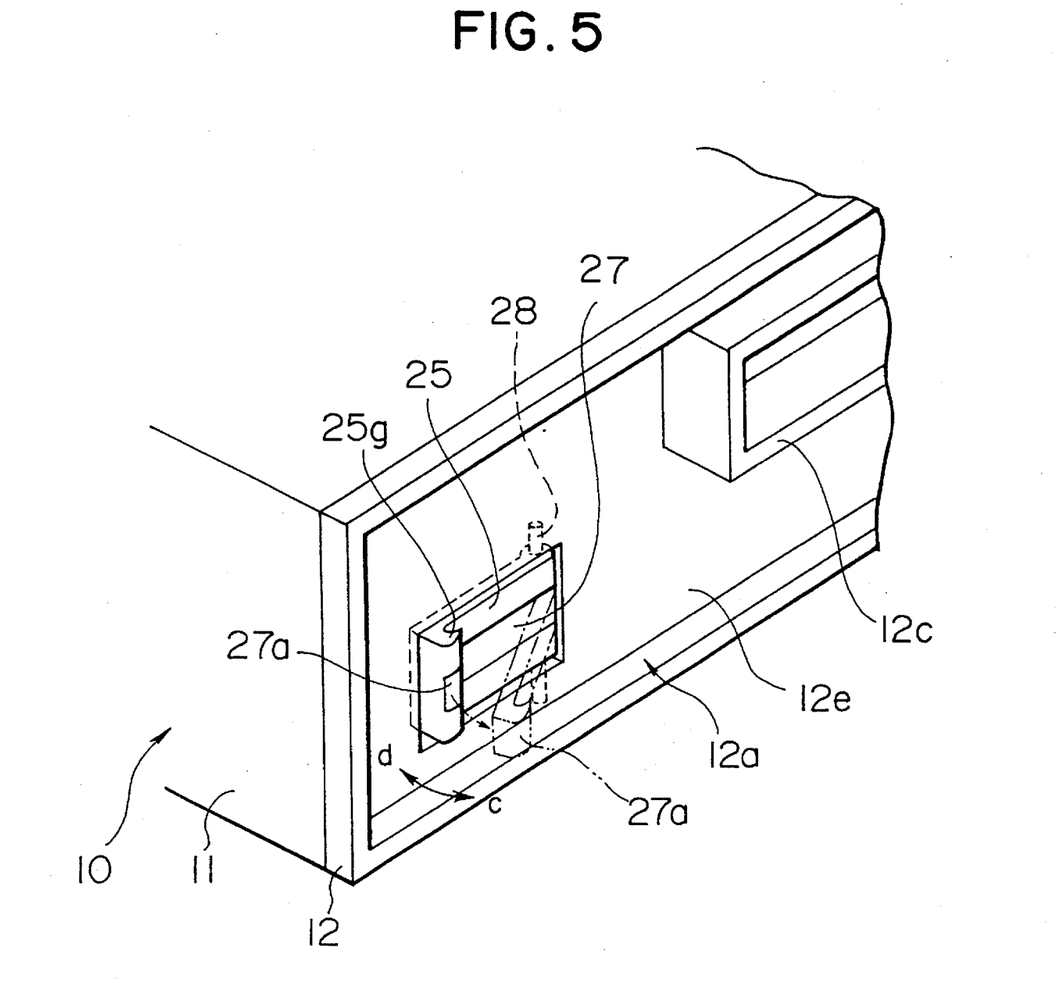
FIG. 5 is a partial perspective view of a nose portion of a second embodiment of the present invention.

FIG. 5 shows a second embodiment of the present invention.

In this embodiment, a locking member 25 is pivotally supported by a support shaft 28 on a recessed bottom surface 12e of a recessed portion 12a of a nose portion 12. The locking member 25 is urged by an urging member (not shown in FIG. 5), such as a spring, in a direction (c), and the position of the locking member 25 shown by the broken line of FIG. 5 is a limit of the pivotal or rotational movement of the locking member 25 in the direction (c). The locking member 25 has a locking hook 25g to be engaged with a retaining portion of a control unit 13.

A temporary retaining member 27, fitted in a recessed portion of the locking member 25, is similarly rotatably supported by the support shaft 28. Although the temporary retaining member 27 is urged to pivot or rotate in the direction (c), as shown by the dotted line, it is stopped in a predetermined position (shown by the solid line) by a stopper formed in the locking member 25 in FIG. 5. In other words, a retaining hook 27a formed in the temporary retaining member 27 and the locking hook 25g of the locking member 25 are continuously located.

When the control unit 13 is attached in the recessed portion 12a of the nose portion 12, the retained portion of the control unit 13 is retained by both the locking hook 25g and the retaining hook 27a. Thus, the control unit 13 is locked while being attached to the nose portion 12.

When a lock release unit 33 disposed on the control unit 13 is depressed (see FIG. 3), the locking member 25 is pushed by a rear end 33b of the lock release unit 33 in a direction (d) and disengaged from the temporary retaining member 27 and the temporary retaining member 27 is pivoted and protrudes in the direction (c) by an urging force of a spring or the like. Then, the control unit 13 is temporarily retained by the retaining hook 27a (see FIG. 5) at a position apart from the nose portion 12 in the same manner as shown in FIG. 4. The temporary engagement of the retaining hook 27a and the control unit 13 is released by pulling the control unit 13 by hand.

The present invention is not limited to the above embodiments. For example, the locking hook 25g of the locking member 25 and the retaining hook 27a of the temporary retaining member 27 may be disposed in close contact with each other or with a space between them in the upward and downward directions (see FIG. 2). Portions of the projection 34a of the control unit 13, which are respectively engaged by the locking hook 25g and the retaining hook 27a, may also be positioned with a space therebetween.

Electronic devices incorporating the present invention can include on-board automotive audio equipment in which a compact disc or a mini disc is loaded instead of a cassette tape. Furthermore, the present invention is not limited to on-board automotive audio equipment and is applicable to on-board automotive navigation systems or on-board automotive and home-use remote controls.

This disclosure is illustrative and not limiting; further modifications will be apparent to one skilled in the art and are intended to fall within the scope of the appended claims.

What is claimed is:

1. A locking and retaining mechanism for use with an electronic device which includes an equipment body and a control unit detachably mounted on said equipment body, said locking and retaining mechanism comprising:

a locking member positioned in said equipment body wherein said locking member selectively engages and disengages a portion of said control unit thereby securing said control unit to said equipment body;

a temporary retaining member positioned in said equipment body whereby said temporary retaining member detachably engages and retains a portion of said control unit;

an urging member coupled to said temporary retaining member, thereby urging said temporary retaining member in a direction such that said temporary retaining member protrudes from said equipment body; and a lock release unit coupled to said locking member whereby when said lock release unit is activated, said locking member disengages and releases said control unit, wherein when said locking member is engaged with said control unit, said temporary retaining member operates together with said locking member to secure said control unit to said equipment body and when said lock release unit causes said locking member to disengage said control unit, said temporary retaining member retains said control unit in a position protruding from said equipment body.

2. A locking and retaining mechanism according to claim 1, wherein said locking member and said temporary retaining member secure said control unit to said equipment body by a same engagement portion formed on said control unit.

3. A locking and retaining mechanism according to claim 2, wherein a portion of said locking member and a portion of said temporary retaining member interlock when said control unit is secured on said equipment body.

4. A locking and retaining mechanism according to claim 3, wherein an engagement member is mounted in said equipment body and is shaped so as to enable said locking member to disengage from said temporary retaining member when said locking member is released by said lock release unit.

5. A locking and retaining mechanism according to claim 1, further comprising:
 a support shaft disposed in said equipment body, wherein said locking member is rotatably supported by said support shaft and said temporary retaining member is both rotatably and linearly slidably supported by said support shaft, said temporary retaining member being urged by said urging member in a linear direction to engage said control unit.

6. A locking and retaining mechanism according to claim 1, wherein said lock release unit is mounted in said control unit.

7. A locking and retaining mechanism according to claim 1, wherein a lock release contact portion is integrally formed as part of said locking member, said lock release contact portion causing said locking member to be moved in a direction to disengage said control unit when said lock release contact portion is contacted by said lock release unit.

8. The locking and retaining mechanism according to claim 1, wherein said electronic device is a cassette player.

9. The locking and retaining mechanism according to claim 1, wherein said electronic device is a CD player.

10. A structure for detachably positioning a control unit to an equipment body of an electronic device, said structure comprising:
 a retaining portion formed on said equipment body;
 a retaining portion formed on a first portion of said control unit, said retaining portion formed on said control unit interlocking with said retaining portion formed on said equipment body;
 a locking member positioned in said equipment body wherein said locking member selectively engages and disengages a second portion of said control unit thereby securing said control unit to said equipment body;
 a temporary retaining member positioned in said equipment body whereby said temporary retaining member detachably engages and retains a portion of said control unit;
 an urging member coupled to said temporary retaining member, thereby urging said temporary retaining member in a direction such that said temporary retaining member protrudes from said equipment body; and
 a lock release unit coupled to said locking member whereby when said lock release unit is activated, said locking member disengages and releases said control unit; and
 wherein when said locking member is engaged with said control unit, said temporary retaining member operates together with said locking member to secure said control unit to said equipment body and when said lock release unit causes said locking member to disengage said control unit, said temporary retaining member retains said control unit in a position protruding from said equipment body.

11. A structure according to claim 10, wherein said locking member and said temporary retaining member secure said control unit to said equipment body by a same engagement portion formed on said control unit.

12. A structure according to claim 11, wherein a portion of said locking member and a portion of said temporary retaining member interlock when said control unit is secured on said equipment body.

13. A structure according to claim 12, wherein an engagement member is mounted in said equipment body and is shaped so as to enable said locking member to disengage from said temporary retaining member when said locking member is released by said lock release unit.

14. A structure according to claim 10, further comprising:
 a support shaft disposed in said equipment body, wherein said locking member is rotatably supported by said support shaft and said temporary retaining member is both rotatably and linearly slidably supported by said support shaft, said temporary retaining member being urged by said urging member in a linear direction to engage said control unit.

15. A structure according to claim 10, wherein said lock release unit is mounted in said control unit.

16. A structure according to claim 10, wherein a lock release contact portion is integrally formed as part of said locking member, said lock release contact portion causing said locking member to be moved in a direction to disengage said control unit when said lock release contact portion is contacted by said lock release unit.

17. A locking and retaining mechanism for use with an electronic device which includes an equipment body and a control unit detachably mountable on said equipment body, said locking and retaining mechanism comprising:
 a locking mechanism whereby said locking mechanism detachably engages and secures said control unit to said equipment body;
 a lock release unit coupled to said locking member whereby said lock release unit selectively causes said locking member to release said control unit from said equipment body; and
 a temporary retaining member located in said equipment body whereby said temporary retaining member detachably engages and retains said control unit;
 wherein when said locking member is disengaged from said control unit by said lock release unit, said temporary retaining member retains said control unit detachably connected to said equipment body.

18. The locking and retaining mechanism of claim 17, further comprising:
 an urging member coupled to said temporary retaining member, whereby when said lock release unit causes said locking member to disengage said control unit, said urging member urges said temporary retaining member forward, thereby causing said control unit to protrude from said equipment body.

19. A locking and retaining mechanism for use with an electronic device which includes an equipment body and a detachably mounted control unit, said locking and retaining mechanism comprising:
 means for retaining a first portion of said control unit to said equipment body;

means for engaging and disengaging a second portion of said control unit thereby securing said control unit to said equipment body;

means for disengaging said control unit from said means for engaging; and means for detachably retaining said control unit to said equipment body after said control unit has been disengaged from said means for engaging by said means for disengaging, wherein said control unit remains detachably connected to said equipment body after said control unit has been disengaged from said means for engaging by said means for disengaging.

20. The locking and retaining mechanism of claim 19, further comprising:

means for urging said control unit to protrude from said equipment body by a predetermined distance after said control unit has been disengaged from said means for engaging by said means for disengaging.

21. A method for locking and retaining a detachably mounted control unit to an equipment body of an electronic device, said method comprising the steps of:

retaining a first portion of said control unit on said equipment body;

engaging and a second portion of said control unit such that said second portion of said control unit is selectively locked to and unlocked from said equipment body; and detachably retaining said control unit on said equipment body after said second portion of said control unit has been selectively unlocked from said equipment body, wherein said control unit remains detachably retained on said equipment body to protrude from said equipment body after said second portion of said control unit has been selectively unlocked from said equipment body.

* * * * *